United States Patent

Mensler et al.

(10) Patent No.: US 7,693,637 B2
(45) Date of Patent: Apr. 6, 2010

(54) HYBRID VEHICLE CONTROL SYSTEM

(75) Inventors: Michel Mensler, Kanagawa (JP);
Shinichiro Joe, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 530 days.

(21) Appl. No.: 11/171,371

(22) Filed: Jul. 1, 2005

(65) Prior Publication Data

US 2006/0009884 A1    Jan. 12, 2006

(30) Foreign Application Priority Data

Jul. 6, 2004   (JP)   ............................. 2004-199242

(51) Int. Cl.
*G06F 7/00* (2006.01)
*G06F 17/00* (2006.01)
*B60W 10/00* (2006.01)

(52) U.S. Cl. ............................... 701/55; 701/1; 701/51;
701/52; 701/56; 701/58; 701/59; 701/66;
180/65.6; 180/65.7; 180/65.8; 477/3; 477/4;
477/5; 477/6; 477/77; 477/78; 477/79; 477/80;
477/166; 903/903; 903/912; 903/917; 903/918;
903/919; 903/945; 903/946

(58) Field of Classification Search ............ 701/1,
701/51, 52, 55, 56, 58, 59, 66–68; 477/3–6,
477/69, 70, 77–80, 166, 169, 174, 175, 179,
477/180; 180/65.6–68.8, 293; 475/5; 903/3,
903/9, 18, 19, 22, 23, 40, 903–946

See application file for complete search history.

(56) References Cited

U.S. PATENT DOCUMENTS

| | | | |
|---|---|---|---|
| 5,081,365 A | | 1/1992 | Field et al. |
| 5,176,213 A | | 1/1993 | Kawai et al. |
| 5,771,478 A | * | 6/1998 | Tsukamoto et al. ........... 701/68 |
| 5,841,201 A | * | 11/1998 | Tabata et al. ............... 290/40 C |
| 5,895,435 A | * | 4/1999 | Ohta et al. .................... 701/59 |
| 6,278,915 B1 | | 8/2001 | Deguchi et al. |
| 6,655,485 B1 | * | 12/2003 | Ito et al. .................... 180/65.6 |
| 2001/0020789 A1 | | 9/2001 | Nakashima |
| 2003/0006076 A1 | * | 1/2003 | Tamor ........................ 180/65.2 |
| 2003/0069104 A1 | * | 4/2003 | Nakano et al. ................. 475/5 |
| 2003/0073534 A1 | * | 4/2003 | Oshidari et al. ............... 475/5 |
| 2005/0023055 A1 | * | 2/2005 | Imazu et al. ............... 180/65.2 |
| 2005/0080540 A1 | * | 4/2005 | Steinmetz et al. ............. 701/55 |
| 2005/0182547 A1 | * | 8/2005 | Sah et al. ...................... 701/67 |

FOREIGN PATENT DOCUMENTS

| | | | |
|---|---|---|---|
| JP | 5042811 | * | 2/1993 |
| JP | 2000-37004 A | | 2/2000 |
| JP | 2000037004 | * | 2/2000 |
| JP | 2003-034153 A | | 2/2003 |

* cited by examiner

*Primary Examiner*—Jack W. Keith
*Assistant Examiner*—Chuong P Nguyen
(74) *Attorney, Agent, or Firm*—Foley & Lardner LLP

(57) ABSTRACT

A vehicle control system is comprised of a controller which is arranged to select an optimal mode adapted to a driving point of a vehicle from an optimal mode map of defining a plurality of running modes of the vehicle, to detect a generation of a mode transition in the optimal mode map, and to hold a current running mode selected before the transition for a holding time period when the generation of the mode transition is detected.

10 Claims, 12 Drawing Sheets

HYBRID VEHICLE CONTROL SYSTEM

BACKGROUND OF THE INVENTION

The present invention relates to a vehicle control system of selecting an optimal mode from a plurality of running modes and switching a current mode to an optimal mode, and more particularly to a control system of a hybrid vehicle, which system is arranged to select an optimal mode from a three-dimensional mode map.

Japanese Published Patent Application No. 2003-34153 discloses a hybrid vehicle equipped with a power train system which is arranged such that a brake is attached to one of rotating elements except for a rotating element connected to a driveline output of a two-degree-of-freedom planetary gearset mechanism. This hybrid vehicle is arranged to be capable of selecting a mode from an EV mode of producing a continuously variable transmission ratio only by two motors, an EV-LB mode of driving the two motors under a fixed transmission ratio produced by engaging a brake, an EIVT mode of producing a continuously variable transmission ratio by driving an internal combustion engine and the two motors and by engaging an engine clutch, and an LB mode of producing a fixed transmission ratio by driving the engine and the two motors and by engaging the engine clutch and the brake, which modes have been stored in a mode map, according to a vehicle running condition.

SUMMARY OF THE INVENTION

However, a control system of this vehicle has a tendency of causing a mode chattering when the vehicle running condition is in the vicinity of a boundary between the EV mode and the EV-LB mode. Although this system is arranged to prevent such mode chattering by providing a hysteresis map of defining a hysteresis region, this provision increases a memory capacity.

It is therefore an object of the present invention to provide a vehicle control system which is capable of avoiding a mode chattering without increasing a memory capacity.

An aspect of the present invention resides in a vehicle control system which comprises a controller which is arranged to select an optimal mode adapted to a driving point of a vehicle from an optimal mode map of defining a plurality of running modes of the vehicle, to detect a generation of a mode transition in the optimal mode map, and to hold a current running mode selected before the transition for a holding time period when the generation of the mode transition is detected.

Another aspect of the present invention resides in a vehicle control system which comprises a transmission and a controller. The transmission comprises a planetary gearset whose rotating elements are connected to an internal combustion engine, at least one motor and an output, an engine clutch through which a rotating element of the planetary gearset is connected to the engine, and an engagement element which is capable of engaging one of the rotating elements except for the rotating elements connected to the engine and an output. The transmission is capable of producing a plurality of running modes by changing the engagement states of the engine clutch and the engagement element. The controller is arranged to select an optimal mode adapted to a driving point of a vehicle from an optimal mode map of defining the running modes, to detect a generation of a mode transition in the optimal mode map, and to hold a current running mode selected before the transition, for a holding time period from the generation of the mode transition, when the generation of the mode transition is detected.

Another aspect of the present invention resides in a method of controlling a hybrid vehicle which method comprises an operation of selecting an optimal mode adapted to a driving point of the hybrid vehicle from an optimal mode map of defining a plurality of running modes, an operation of detecting a generation of a mode transition in the optimal mode map and an operation of holding a current running mode selected before the transition for a holding time period when the generation of the mode transition is detected.

The other objects and features of this invention will become understood from the following description with reference to the accompanying drawings.

DETAILED DESCRIPTION OF THE INVENTION

Referring to FIGS. 1 through 15, there is discussed a control system of a hybrid vehicle according to a first embodiment of the present invention.

Figure 1:
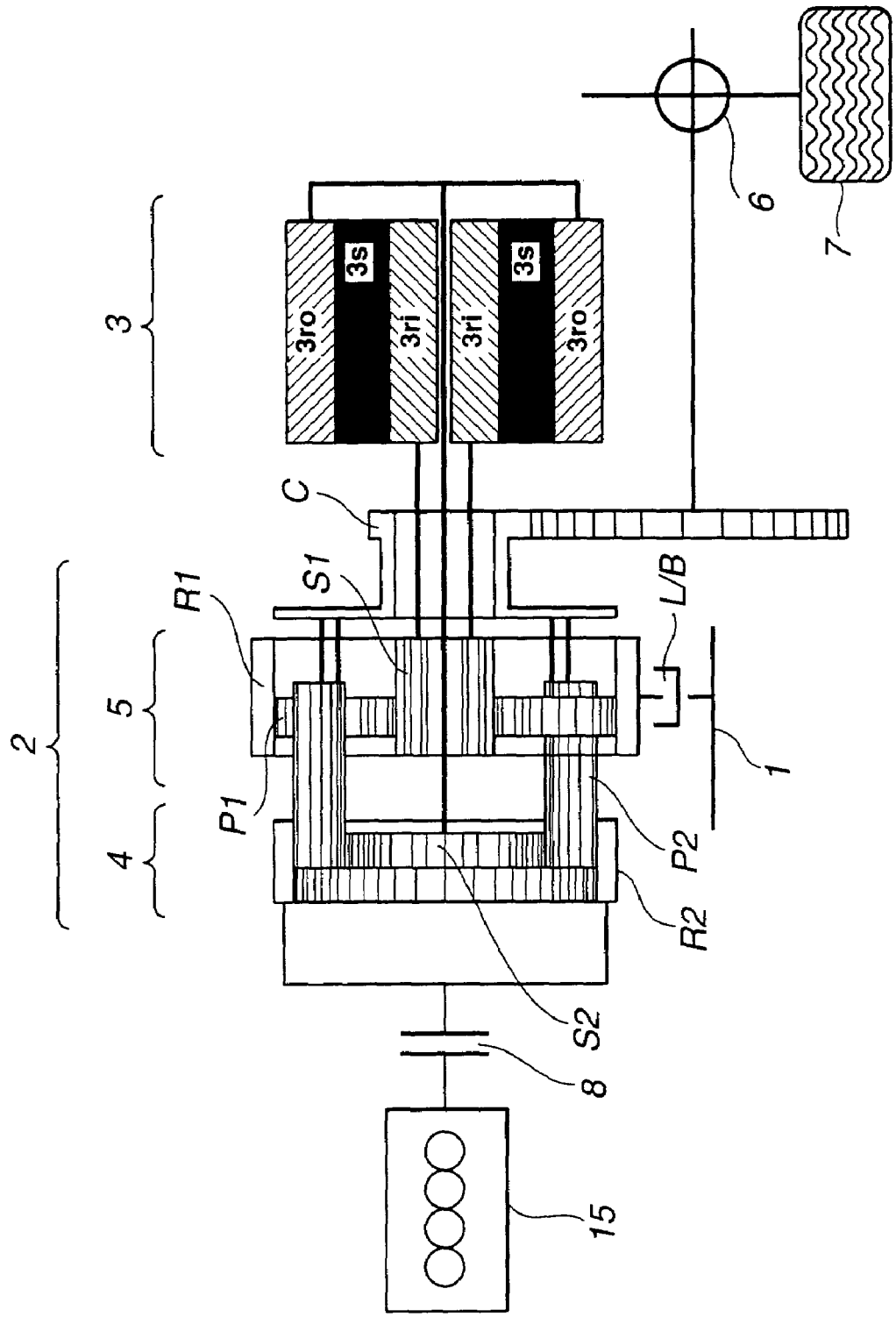
FIG. 1 is a view showing a mechanical structure of a hybrid system according to a first embodiment of the present invention.

As shown in FIG. 1, a hybrid transmission of the hybrid vehicle according to the first embodiment of the present invention is constructed so as to be preferably adapted to a transaxle of a front-wheel-drive vehicle.

As shown in FIG. 1, the hybrid transmission is constructed by coaxially arranging an internal combustion engine 15, a Ravigneaux planetary gearset 2 and a compound-current double-layer motor 3 in tandem. Ravigneaux planetary gearset 2 is constructed by a single-pinion planetary gearset 4 and a double-pinion planetary gearset 5 which commonly employ common pinions P2. Single-pinion planetary gearset 4 has a structure that common pinions P2 are meshed with a sun gear S2 and a ring gear R2. Double-pinion planetary gearset 5 comprises a sun gear S1, common pinions P2, a ring gear R1, and large-diameter pinions P1. Double-pinion planetary gearset 8 has a structure that large-diameter pinions P1 are meshed with sun gear S1, ring gear R1 and common pinions P2. Pinions P1 and P2 of the two planetary gearsets 4 and 5 are rotatably supported on shafts that integrally project from a common carrier C.

Ravigneaux planetary gearset 2 is mainly constituted by seven rotating members, that is, sun gear S1, sun gear S2, ring gear R1, pinions P1, pinions P2 and carrier C. When rotating conditions of two of the rotating members in Ravigneaux planetary gearset 2 are determined, rotating conditions of all of the rotating members are determined. That is to say, Ravigneaux planetary gearset 2 is a two-degree-of-freedom differential mechanism having seven rotating elements.

An engine 15 is coaxially disposed at the left hand side in FIG. 1, and a crankshaft of engine 15 is connected to ring gear R2 so as to input the revolution of engine 15 to ring gear R2 of Ravigneaux planetary gearset 2. On the other hand, carrier C of Ravigneaux planetary gearset 2 is connected to a wheel driveline Out so that an output revolution of Ravigneaux planetary gearset 2 is outputted from carrier C. Such a wheel driveline Out is, for example, a final speed reduction device 6 including a final differential gear device, and right and left wheels 7 in FIG. 1.

Compound-current double-layer motor 3 comprises an inter rotor 3ri, an annular outer rotor 3ro surrounding inner rotor 3ri and a stator coil 3s. Inner and outer rotors 3ri and 3ro are coaxially arranged with each other at the rear axial end in transmission case 1 and rotatably supported in transmission case 1. Annular stator coil 3s acting as a stator of compound-current double-layer motor 3 is disposed in an annular space defined between the outer periphery of inner rotor 3ri and the inner periphery of outer rotor 3ro and is fixedly connected to transmission case 1.

Annular stator coil 3s and outer rotor 3ro construct an outer motor/generator (first motor/generator) MG1, and annular stator coil 3s and inner rotor 3ri construct an inner motor/generator (second motor/generator) MG2.

When compound multiphase alternating current is supplied to each of first and second motor/generators MG1 and MG2, each of motor/generators MG1 and MG2 functions as an electric motor which outputs a rotational force having a revolution direction corresponding to a current direction and a revolution speed (including a stopping state) corresponding to a current strength of the supplied current. When no compound multiphase alternating current is supplied to each of first and second motor/generators MG1 and MG2, each of first and second motor/generators MG1 and MG2 functions as a generator which outputs an electric power corresponding to the magnitude of torque applied by way of an external force. This compound-current multi-layer motor 3 is connected to Ravigneaux planetary gearset 2 such that sun gear S1 of double-pinion planetary gearset 5 is connected to first motor/generator MG1, (inner rotor 3ri) and sun gear S2 of single-pinion planetary gearset 4 is connected to second motor/generator MG2 (outer rotor 3ro).

Figure 2:
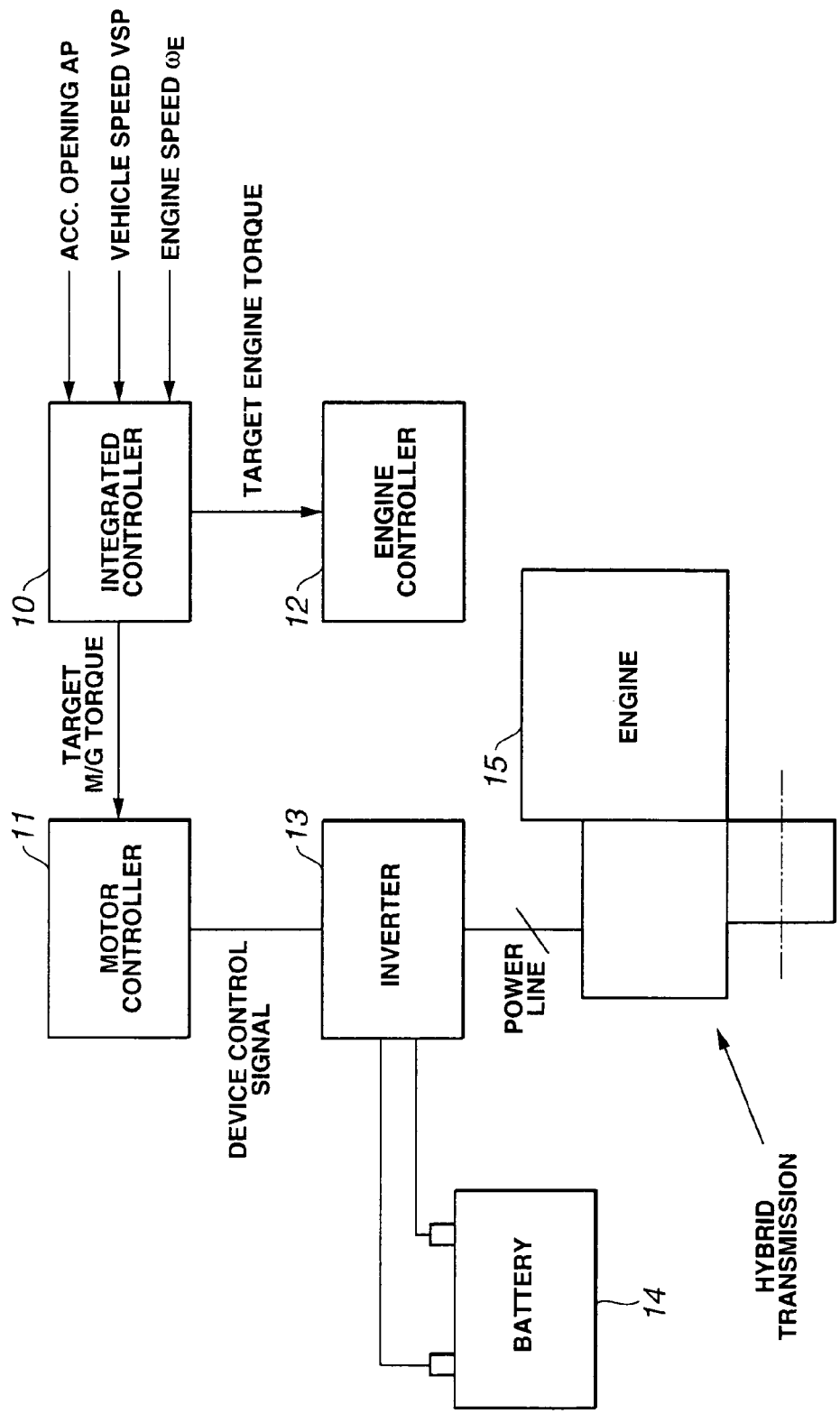
FIG. 2 is a block diagram showing a control construction of the hybrid system of the first embodiment.

FIG. 2 shows a construction of a hybrid system including a control system.

A hybrid system (E-IVT system) of the first embodiment comprises an integrated controller 10 for integrally controlling total energy of the hybrid system, an engine controller 12 for controlling engine 15, a motor controller 11 for controlling first and second motor/generators MG1 and MG2 of the hybrid transmission, an inverter 13 for supplying electric power to first and second motor/generators MG1 and MG2, a battery 14 for storing electric energy, and the hybrid transmission including first and second motor/generators MG1 and MG2. Engine controller 12 includes engine clutch controller of controlling engagement and disengagement of an engine clutch 8.

Integrated controller 10 outputs a command indicative of a target motor/generator torque to motor controller 11 and a command indicative of a target engine torque to engine controller 12 according to accelerator opening AP, engine speed $\omega_E$ and vehicle speed VSP, which is in proportion to a revolution speed of an output shaft, so as to achieve a driving state intended by a driver. Herein, the revolution speed inputted to integrated controller 10 is not limited to the engine speed and the output shaft revolution speed, and may be the revolution speeds of two of the rotating members of Ravigneaux planetary gearset 2. Since the degree of rotational freedom of Ravigneaux planetary gearset 2 is two, the revolution speeds of all rotating members of Ravigneaux planetary gearset 2 are determined by determining the revolution speeds of two of the rotating members of Ravigneaux planetary gearset 2.

The command to motor controller 11 may be a target motor/generator revolution speed instead of the target motor/generator torque by constructing a control system of achieving the target motor/generator revolution speed using PI controller.

(Control Mode in E-IVT System)

E-IVT system mainly includes the following four modes.
1) EV mode (MODE4)
2) EV-LB mode (MODE6)
3) EIVT mode (MODE28)
4) LB mode (MODE30)

Both of first and second motor/generators MG1 and MG2 operates in the four modes. The four modes are differentiated by differentiating an operating state of engine 15 (or engine clutch 8) and an operation of a low brake LB.

Table 1 represents the relationship of on-off state of engine clutch 8 and an engaged state of low brake LB in the four modes. The selection of a mode of the four modes is limited. That is, each of the four modes has a limited control region wherein each of the four modes is limitedly selected and achieve the desired control mode.

TABLE 1

| | | Low Brake | |
|---|---|---|---|
| | | OFF | ON |
| Engine | OFF | EV mode (mode 4) | EV-LB mode (mode 6) |
| Clutch | ON | EIVT mode (mode 28) | LB mode (mode 30) |

The respective control regions of the four modes are constructed in a three-dimensional space defined by three axes which are vehicle speed VSP, a driving force F and a SOC (state of charge) of battery 14. The control regions of the four modes are generally degreased as SOC is decreased. Herein, driving force F is a demanded driving force necessary for driving the vehicle. Particularly, a point determined by vehicle speed VSP and driving force R is represented as a driving point. Further, the torque and the revolution speed of each of engine ENG and first and second motor/generators MG1 and MG2 are represented as an operating point.

The control mode of E-IVT system is determined according to the respective torques and the respective revolution speeds ($T_1$, $N_1$, $T_2$, $N_2$, $T_e$, $N_e$) of first and second motor/generators MG1 and MG2 and engine 15, and the electric power consumption quantity. The demanded driving force F is determined from the accelerator pedal opening manipulated by the driver and vehicle speed VSP, and an optimal mode is selected from the four modes.

[EV Mode (MODE4)]

In EV mode, only first and second motor/generators MG1 and MG2 are operated. When the torques and the revolution speeds of first and second motor/generators MG1 and MG2 are $T_1$, $T_2$, $N_1$ and $N_2$, respectively, and the output shaft torque is $T_o$, and the output shaft revolution speed is $N_o$ in Ravigneaux planetary gearset 2, relationships represented by the following expressions (1) is established in EV mode.

$$N_2 = \{-\beta N_1 + (1+\alpha+\beta)N_o\}/(1+\alpha)$$

$$T_1 = \beta T_0/(1+\alpha+\beta)$$

$$T_2 = (1+\alpha)T_0/(1+\alpha+\beta) \quad (1)$$

where $\alpha$ and $\beta$ correspond to gear ratios of Ravigneaux planetary gearset 2. When a gear ratio between ring gear Rs (engine) and carrier C (output shaft) is 1, a gear ratio between ring gear R2 and sun gear S1 (MG1) is $\alpha$, and a gear ratio between carrier C and sun gear S1 (MG2) is $\beta$.

Figure 3:
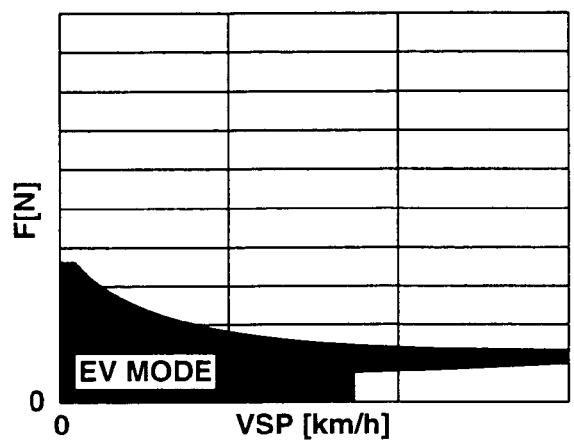
FIG. 3 is a graph showing a map representative of a control region of EV mode of the hybrid system of the first embodiment.

The driving force control of EV mode (MODE4) is executed on the basis of the expressions (1). FIG. 3 shows a control region of EV mode (MODE4), which mode is determined according to vehicle speed VSP and demanded driving force F. In the control region of E-IVT system, the control region in which the operating point determined by two inputs (vehicle speed VSP and demanded driving force F) is contained is determined as an optimal mode.

[EV-LB Mode (MODE6)]

Figure 4:
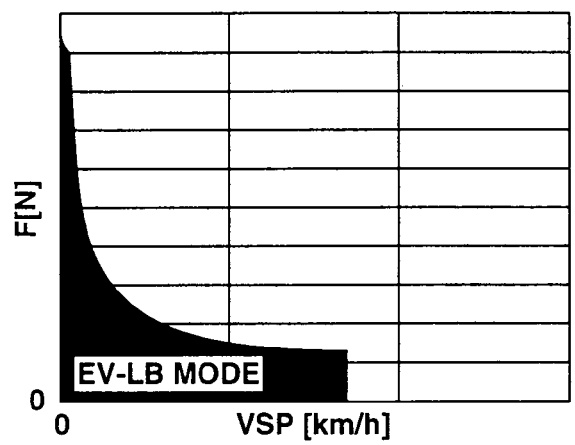
FIG. 4 is a graph showing a map representative of a control region of EV-LB mode of the hybrid system of the first embodiment.

In EV-LB mode, first and second motor/generators MG1 and MG2 and low brake LB are operated. FIG. 4 shows a control region of EV-LB mode (MODE6), which mode is determined according to vehicle speed VSP and demanded driving force F. When EV-LB mode is selected, the driving force control of V-LB mode is executed on the basis of the following expressions (2).

$$N_1 = (1+\alpha+\gamma)N_0/\gamma$$

$$N_2 = (\gamma-\beta)N_0/\gamma$$

$$T_2 = \{(1+\alpha+\gamma)T_1 - \gamma T_0\}/(\beta-\gamma)$$

$$T_L = T_0 - T_1 T_2 \quad (2)$$

where $T_L$ is a torque of a low brake LB, $\gamma$ is a gear ratio between a carrier C and the low brake LB.

[EIVT Mode (MODE28)]

Figure 5:
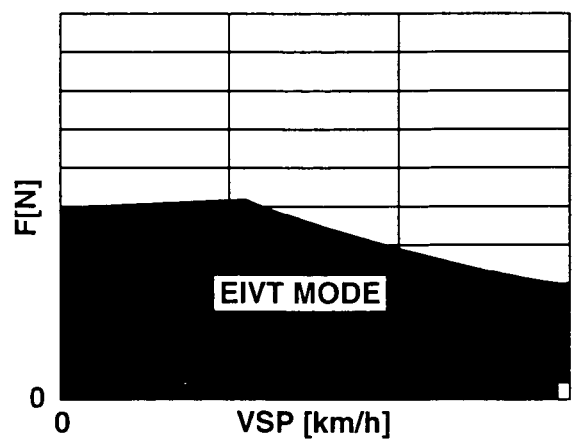
FIG. 5 is a graph showing a map representative of a control region of EIVT mode of the hybrid system of the first embodiment.

In EIVT mode, first and second motor/generators MG1 and MG2 and engine 15 are operated. FIG. 5 shows a control region of EIVT mode (MODE28), which mode is determined according to vehicle speed VSP and demanded driving force F. When EIVT mode is selected, the driving force control of EIVT mode is executed on the basis of the following expressions (3).

$$N_1 = -\alpha N_0 + (1+\alpha)N_e$$

$$N_2 = (1+\beta)N_0 - \beta N_e$$

$$T_1 = \{1/(1+\alpha+\beta)\}\{\beta T_0 - (1+\beta)T_e\}$$

$$T_2 = T_0 - T_1 - T_e \quad (3)$$

where Ne is an engine speed, and Te is an engine torque.

[LB Mode (MODE30)]

Figure 6:
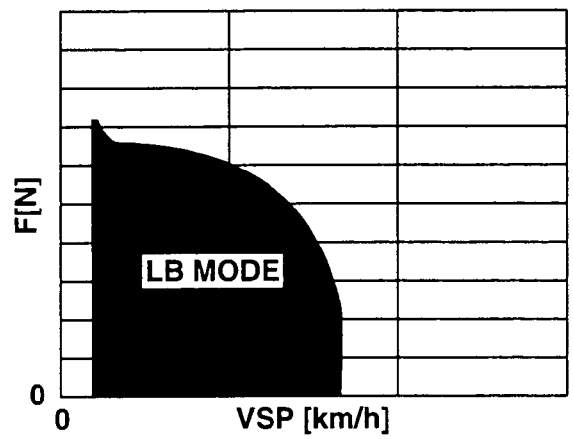
FIG. 6 is a graph showing a map representative of a control region of LB mode of the hybrid system of the first embodiment.

In LB mode, first and second motor/generators MG1 and MG2, engine 15 and low brake LB are operated. FIG. 6 shows a control region of LB mode (MODE30), which mode is determined according to vehicle speed VSP and demanded driving force F. (the control region of mode 30 depends on three inputs.) When LB mode is selected, the driving force control of LB mode is executed on the basis of the following expressions (4).

$$N_1 = \{(1+\alpha+\gamma)/\gamma\}N_o$$

$$N_2 = -\{(\beta-\gamma)/\gamma\}N_o$$

$$Ne = \{(1+\gamma)/\gamma\}N_o$$

$$T_L = T_o - T_1 T_2 - T_e$$

$$T_2 = \{1/(\beta-\gamma)\}(-\gamma T_o + (1+\alpha+\gamma)T_1 + (1+\gamma)T_e) \quad (4)$$

Although there are explained the four control modes, the invention is not limited to these four modes. For example, a high-brake mode may be further added to the control mode by adding a high-brake of fixing first motor/generator MG1 to transmission case 1.

[Processing for Selecting Optimal Mode According to SOC]

A driving point, which is determined by vehicle speed VSP and demanded driving force F, is achieved by a plurality of modes of the above-discussed modes. Under this condition, a mode, which performs the most fuel consumption in the plurality of the modes, is selected. More specifically, an electric power balance of first and second motor/generators MG1 and MG2 is calculated. Subsequently, a mode performing the best fuel consumption is selected from the relationship between the electric power balance and the fuel consumption.

Herein, a driving efficiency EFF representative of a contribution of 1 cc fuel to the driving force is employed prior to SOC. The driving efficiency EFF is closely related to SOC. When SOC is high, it is not necessary to charge battery 14. Since the fuel consumption quantity is small under this condition, the fuel supplied to engine 15 is used for generating the driving force, and therefore the driving efficiency EFF is high. On the other hand, when SOC is low, it is necessary to charge battery 14. That is, since it is necessary to drive engine 15 to charge battery 14, the fuel consumption quantity increases and therefore the driving efficiency EFF becomes low. By converting the relationship between the mode and the driving efficiency EFF to the relationship between the mode and SOC using the above-discussed relationship between EFF and SOC, an optimal mode map, which defines a plurality of running modes of the vehicle is constructed.

[Optimal Mode Map Constructing Theorem]

Subsequently, there is explained the optimal mode map constructing theorem.

(First Step)

Electric powers E in the all executable modes are calculated along the fuel consumption axis of engine 15. Electric power E corresponds to the power balance of first and second motor/generators MG1 and MG2 and an electric power loss including a motor loss and an inverter loss.

(Second Step)

An electric power function E=f(FUEL) is a function of electric power E according to the fuel consumption. A mode, in which the maximum electric power is capable of being generated relative to the respective fuel consumption quantity, is selected based on the relationship between the electric powers E of the executable modes calculated in the first step. That is, the optimal mode function relative to the fuel consumption quantity FUEL is obtained. Herein, E>0 represents a condition that battery 14 is being charged, and E<0 represents a condition that battery 14 is being discharged.

(Third Step)

A drive efficiency function EFF=g(FUEL) is calculated from the electric power function E=f(FUEL) obtained at second step. The drive efficiency function EFF=g(FUEL) is an electric power ratio relative to the fuel consumption quantity. More specifically, a contribution degree of the improvement of the electric power balance by the fuel is proved by obtaining a ratio of the electric power balance $\{E(i)-E(FUEL_0)\}$, which is increased by further consuming the fuel by a consumption increase $\{FUEL(i)-FUEL_0\}$, relative to the fuel consumption quantity $FUEL_o$ in the case that the electric power of battery 14 is utilized at its maximum. That is, the contribution degree of the improvement of the electric power balance represents the drive efficiency EFF which represents an utilization degree of the fuel for the driving force F.

(Fourth Step)

By executing an inverse conversion of the drive efficiency function EFF=g(FUEL) obtained in third step, a fuel consumption function FUEL=h1(EFF) is calculated.

(Fifth Step)

From the calculation results of fourth step and second step, a mode function Mode=h2(EFF) is obtained. That is, the control mode according to the estimated drive function EFF is obtained.

By executing the above discussed steps, a three-dimensional optimal mode map based on vehicle speed VSP, demanded driving force F and driving efficiency EFF is constructed. Driving efficiency EFF is obtained as a variable from electric power E and fuel consumption quantity FUEL. Since SOC and EFF has a close relationship as discussed above, the three-dimensional optimal mode map based on vehicle speed VSP, driving force F and SOC is constructed by utilizing the relationship between SOC and EFF.

[Control of Revolution Speed and Torque by Integrated Controller]

Figure 7:
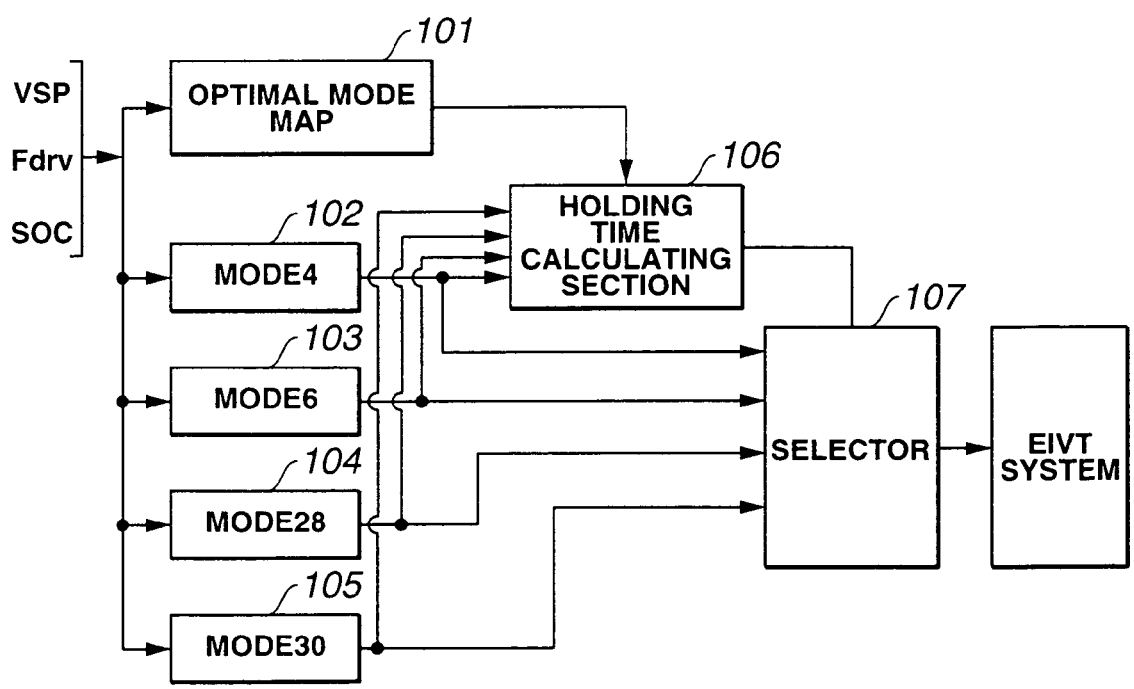
FIG. 7 is a block diagram showing the control construction of an integrated controller of the first embodiment.

Subsequently, there is discussed a construction of integrated controller 10. FIG. 7 is a block diagram showing a control configuration of integrated controller 10.

A mode calculating section 101, which has stored the optimal mode map, selects an optimal mode corresponding to a driving point determined based on vehicle speed VSP, SOC (electric power charge quantity ΔC including a prediction value thereof), and an electric power discharge quantity ΔD (including a prediction value thereof). Mode calculating section 101 further outputs a mode command indicative of the selected optimal mode to a holding time calculating section 106.

Each of target value calculating sections 102, 103, 104 and 105 calculates an optimal target revolution speed and an optimal target torque of each of engine 15, first and second motor/generators MG1 and MG2, on the basis of the demanded driving force F, vehicle speed VSP and SOC.

Holding time calculating section 106 calculates a holding time during which a current mode is held when a mode transition is detected. Holding time calculating section 106 outputs a signal indicative of the current mode as an optimal mode to a selector 107 when the holding time does not elapse from the detection of the mode transition. Further, holding time calculating section 106 outputs a signal indicative of the optimal mode selected at mode calculating section 101 to selector 107 when the holding time elapsed from the detection of the mode transition.

Selector 107 selects an optimal control and outputs a command signal to controller 11 and engine controller 12 of E-IVT system.

[Construction of Target Value Calculating Sections]

There is discussed a control processing executed at target value calculating sections 102 through 105. By executing this control processing, optimal target values ($T_e^*$, $N_e^*$), ($T_1^*$, $N_1^*$) and ($T_2^*$, $N_2^*$) of each control mode at a driving point determined by vehicle speed VSP, demanded driving force F and SOC (ΔC, ΔD) are determined.

Target value calculating section 102 reads first motor/generator target revolution speed $N_1^*$ in EV mode, from the mode map for EV mode (MODE4). Second motor/generator target revolution speed $N_2^*$ is calculated from the expressions (1) using vehicle speed VSP, first motor/generator target revolution speed $N_1^*$. First and second motor/generator target torques $T_1^*$ and $T_2^*$ are calculated from the expressions (1) using the output torque To corresponding to demanded driving force F.

Target value calculating section 103 reads first motor/generator target torque $T_1^*$ in EV-LB mode, from the mode map for EV-LB mode (MODE6). Second motor/generator target torque $T_2^*$ is calculated from the expressions (2) using output shaft torque To corresponding to demanded driving force F and first motor/generator target torque $T_1^*$. First and second motor/generator target revolution speeds $N_1^*$ and $N_2^*$ are calculated from the expressions (2) using vehicle speed VSP.

Target value calculating section 104 reads engine target torque $T_e^*$ and engine target revolution speed $N_e^*$ in EIVT mode, from the mode map for EIVT mode (MODE28). First and second motor/generator revolution speeds $N_1^*$ and $N_2^*$ are calculated from the expressions (3) using vehicle speed VSP and engine target revolution speed $N_e^*$. First motor/generator target torque $T_1^*$ is calculated from engine target torque $T_e^*$, output shaft torque To corresponding to demanded driving force F. Second motor/generator target torque $T_2^*$ is calculated from the expressions (3), based on first motor/generator target torque $T_1^*$, engine target torque $T_e^*$, and demanding driving force F corresponding with output shaft torque To.

Target value calculating section 105 reads engine target torque $T_e^*$ and first motor/generator target revolution speed $N_1^*$ in LB mode, from the mode map for LB mode (MODE30). Each target revolution speed $N_e^*$, $N_1^*$, $N_2^*$ is calculated from the expressions (4) using vehicle speed VSP. Second motor/generator target torque $T_2^*$ is calculated from the expressions (4) based on first motor/generator target torque $T_1^*$, engine target torque $T_e^*$, and demanding driving force F corresponding with output shaft torque To.

[As to Holding Time Calculating Section]

Figure 8:
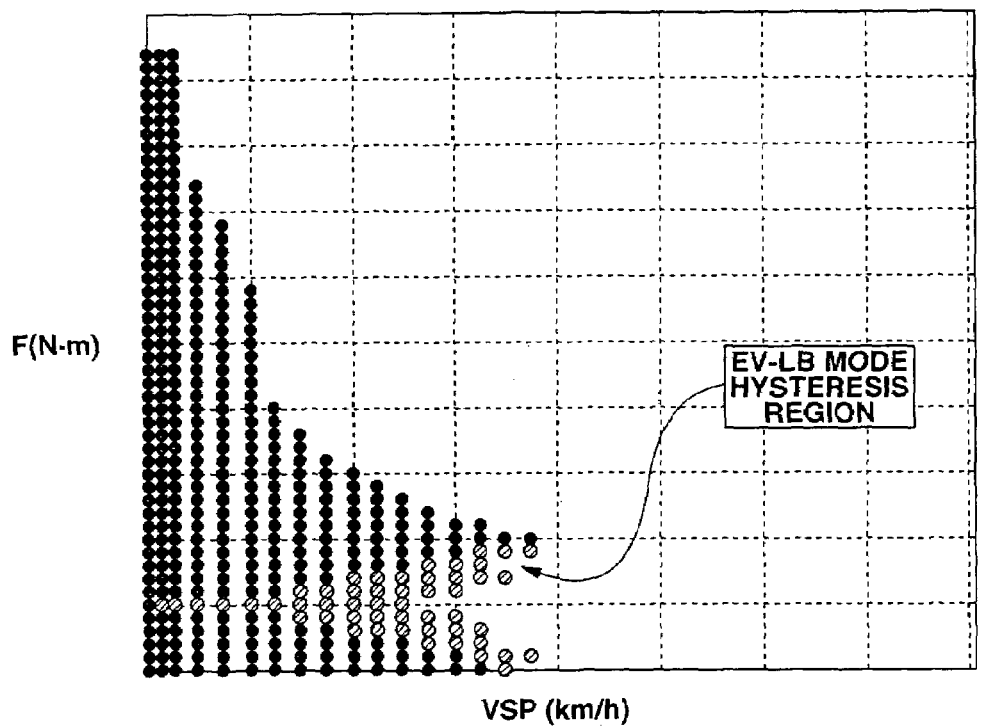
FIG. 8 is a hysteresis map of EV-LB mode employed in the known art.
Figure 9:
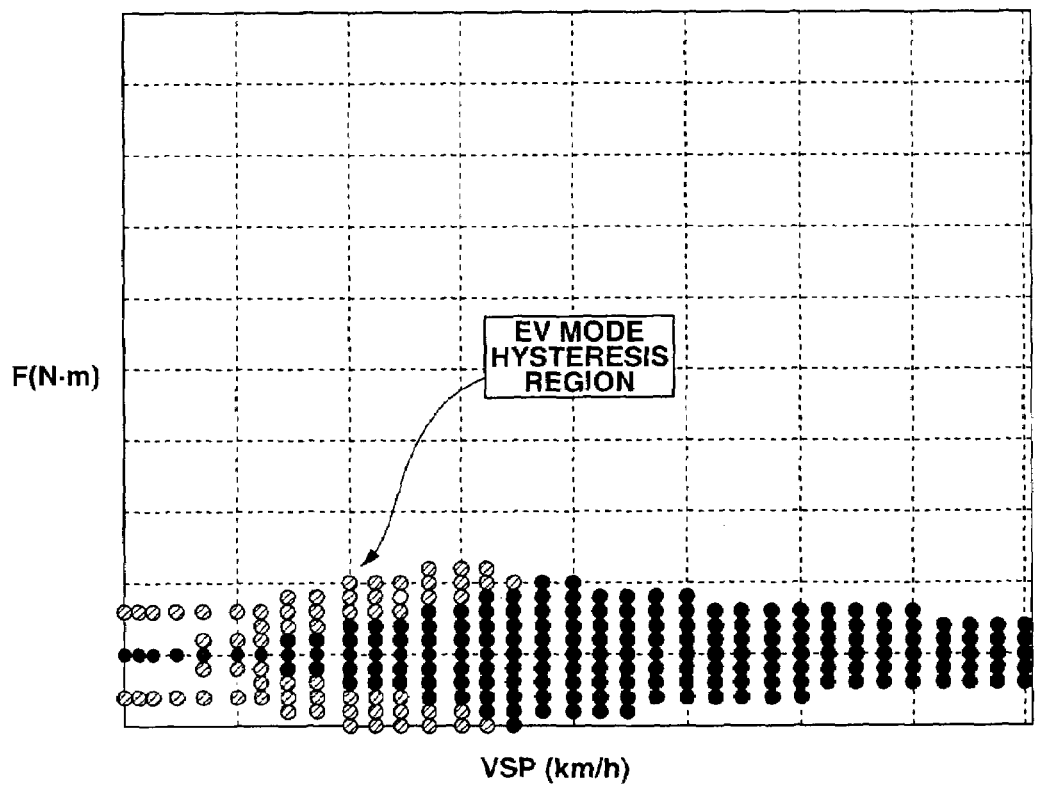
FIG. 9 is a hysteresis map of EV mode employed in the known art.

There are discussed holding time calculating section 106 and a problem of a prior art. FIG. 8 shows a hysteresis map of EV-LB mode (MODE6) under a predetermined SOC in the prior art. FIG. 9 shows a hysteresis map of EV mode (MODE4) under the predetermined SOC in the prior art. Hysteresis regions shown in FIGS. 8 and 9 are set at boundary regions of EV-LB mode and EV mode in the optimal mode map. Even if the optimal mode is EV mode under EV-LB mode, EV mode is held. On the other hand, even if the optimal mode is EV-LB mode under EV mode, EV-LB mode is held. This holding arrangement prevents a mode chattering.

However, it is necessary to newly store a plurality of hysteresis maps in memory. This will require the increase of the capacity of the memory. Since the region once stored in the memory cannot be changed during the vehicle running state, there is a possibility that an energy loss of the system increases under a certain running condition. Therefore, the first embodiment according to the present invention has been arranged to executed the mode chattering preventing processing based on a time period, which is calculated taking account of a transition energy necessary for the mode transition, a running load and a prevention of a shock due to the mode transition. Although the explanation of the mode transition has been made as to a mode transition between EV mode and EV-LB mode to facilitate the explanation, it will be understood that the explained mode transmission may be adapted to a mode transition between other control modes.

Figure 10:
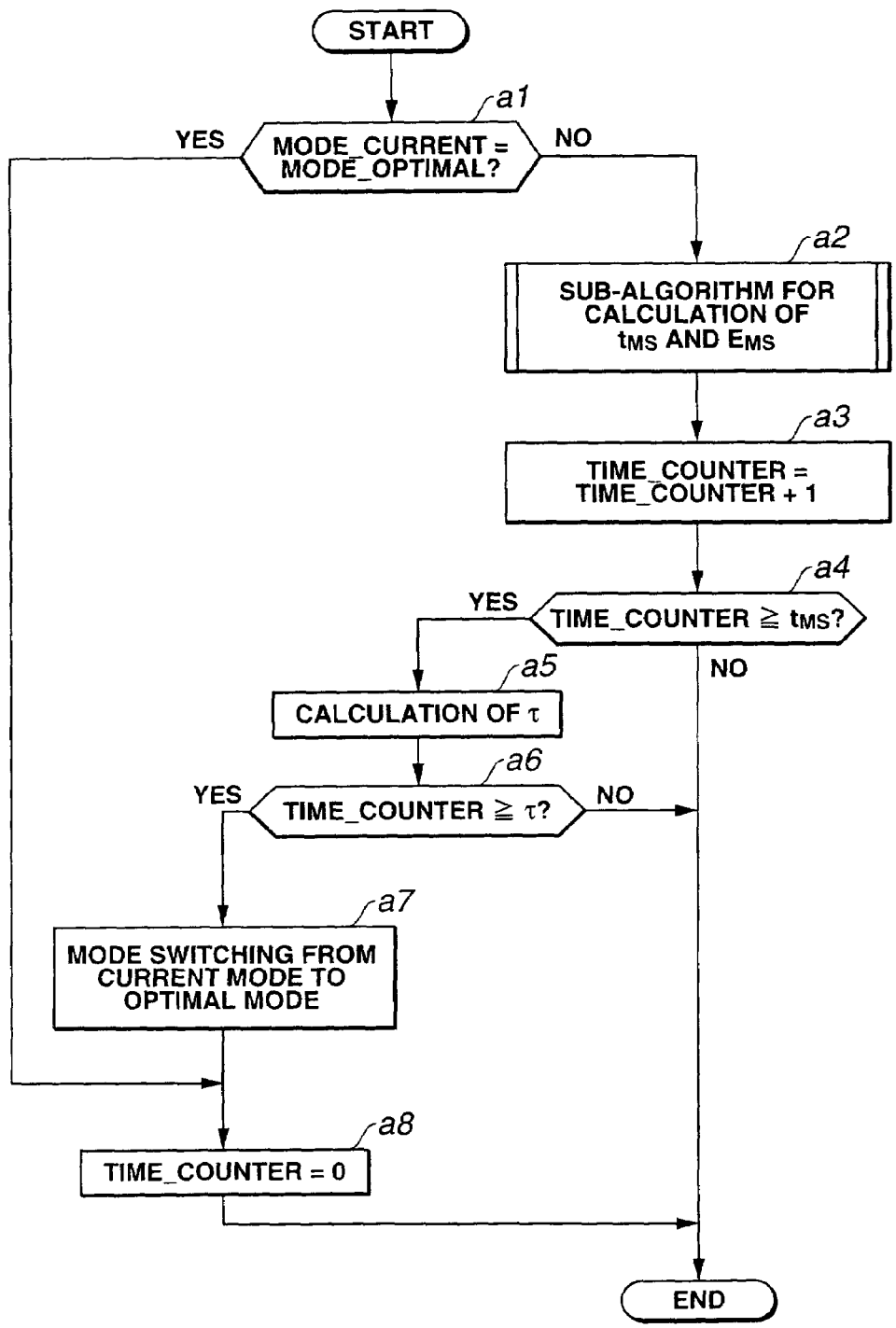
FIG. 10 is a flowchart showing a mode-chattering preventing control processing of the first embodiment.

There is discussed a mode chattering preventing control processing executed by integrated controller 10 of the first embodiment according to the present invention, with reference to a flowchart shown in FIG. 10.

At step a1, it is determined whether or not the current mode (now selected mode) is coincident with the optimal mode. When the current mode is coincident with the optimal mode (MODE_CURRENT=MODE_OPTIMAL), the present routine jumps to step a8 wherein a counter TIME_COUNTER is reset (TIME_COUNTER=0), and the present routine then proceeds to an end block to terminate the present routine. When the determination at step a1 is negative, that is, when the current mode is not coincident with the optimal-mode, the routine proceeds to step a2.

At step a2, a transition time $t_{MS}$ and a transition energy $E_{MS}$ for the mode transition (mode switching) are calculated. This calculation processing executed as a sub-algorithm is discussed later.

At step a3, the counter TIME_COUNTER is counted up (TIME_COUNTER=TIME_COUNTER+1).

At step a4, it is determined whether or not the counter TIME_COUNTER becomes greater than or equal to transition time $t_{MS}$. When the determination at step a4 is affirmative, that is, when counter TIME_COUNTER becomes greater than or equal to transition time $t_{MS}$, the routine proceeds to step a5. When the determination at step a4 is negative, the routine proceeds to the end block to terminate the present routine.

At step a5, a time τ, at which the sum E(optimal) of energy at a moment of the transition to the optimal mode and the transition energy $E_{MS}$ becomes coincident with energy E(current) in the case that the current mode is held, is calculated.

At step a6, it is determined whether or not the counter TIME_COUNTER becomes greater than or equal to the time τ. When the determination at step a6 is affirmative, that is, when the counter TIME_COUNTER is greater than or equal to the time τ, the routine proceeds to step a7. When the determination at step a6 is negative, the present routine is terminated.

At step a7, the control mode is transited (switched) from the current mode to the optimal mode.

At step a8, the counter TIME_COUNTER is reset (TIME_COUNTER=0).

Figure 11:
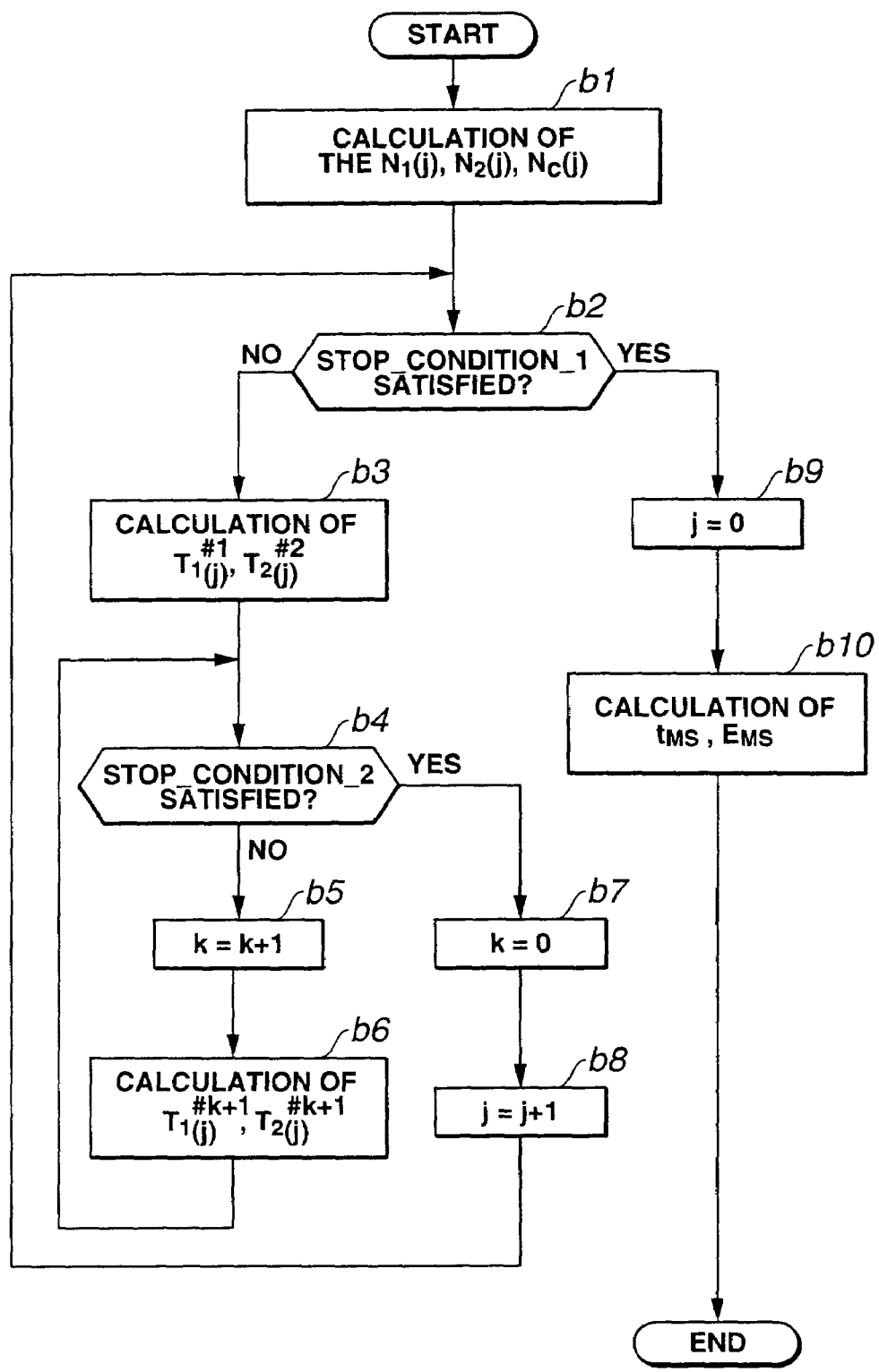
FIG. 11 is a flowchart showing a transition energy calculation processing of the first embodiment.

Subsequently there is discussed the calculation processing of calculating transmission time $t_{MS}$ and transition energy $E_{MS}$ employed at step a2, with reference to a flowchart shown in FIG. 11.

At step b1, revolution speeds $N_1(j)$, $N_2(j)$, $N_c(j)$, where {j=1, 2, 3}, are calculated. Herein, Nc is a revolution speed of the engine clutch 8, and j is a freely settable positive integer. Although the first embodiment according to the present invention is arranged such that the revolution speeds $N_1(j)$ are differentiated at almost equal intervals in the first embodiment, the revolution speeds $N_1(j)$ may be further divided into the greater number of the revolution speeds $N_1(j)$. That is, j may be increased.

At step b2, it is determined whether or not the calculations as to all revolution speeds (from j=1 to j=3) are terminated. When the determination at step b2 is affirmative, that is, when all revolution speeds $N_1(1)$, $N_2(1)$, $N_c(1)$, $N_1(2)$, $N_2(2)$, $N_c(2)$, $N_1(3)$, $N_2(3)$ and $N_c(3)$ have been calculated, the routine proceeds to step b9. When the determination at step b2 is negative, the routine proceeds to step b3.

At step b3, initial provisional torques $T_{1(j)}^{\#1}$ and $T_{2(j)}^{\#1}$, which correspond to j limited by battery maximum discharging electric power $P_{B,max}$ and battery maximum changing electric power $P_{B,min}$.

At step b4, it is determined whether or not a predetermined number of the repetitive calculations have been executed, that is, it is determined whether or not a calculation stop condition STOP_CONDITION_2 for stopping the repetitive calculation is satisfied. When the determination at step b4 is negative, the routine proceeds to step b5. When the determination at step b4 is affirmative, the routine proceeds to step b7.

At step b5 subsequent to the negative determination at step b4, a counter k is counted up by 1 (k=k+1).

At step b6, provisional torques $T_{1(j)}^{\#k}$ and $T_{2(j)}^{\#k}$ corresponding to the counted times of counter k are calculated.

At step b7 subsequent to the affirmative determination at step b4, counter k is reset (k=0).

At step b8, a counter j is counted up (j=j+1) and subsequently the routine returns to step b2.

At step b9 subsequent to the affirmative determination at step b2, counter j is reset (j=0).

At step b10, transmission time $t_{MS}$ and transition energy $E_{MS}$ are calculated, and subsequently the routine proceeds to the end block to terminate the present routine.

Herein, $T_o$ represents a target value of torque, which value is in proportion with the driving force; $T_R$ represents a running resistance (estimated value); $P_{B,max}$ represents the battery maximum discharging electric power; $P_{B,min}$ represents the battery minimum charging electric power; LOSS represents an electric loss (losses of first and second motor/generators MG1 and MG2 and inverter 13; $T_1$ represents first motor/generator torque, $T_2$ represents second motor/generator torque; $N_1$ represents first motor/generator revolution speed; $N_2$ represents second motor/generator revolution speed; $k_1$, $k_2$, $k_3$, $k_4$, $k_5$ and $k_6$ represent variables relating to optimal mode; and $\omega_i$ (=$N_c$) represents input revolution speed which corresponds to the revolution speed of engine clutch 8.

Although an estimating method of running resistance $T_R$ is not limited, it is obtained by estimating the vehicle acceleration relative to the consumed energy. Therefore, the explanation thereof is omitted herein.

Figure 12:
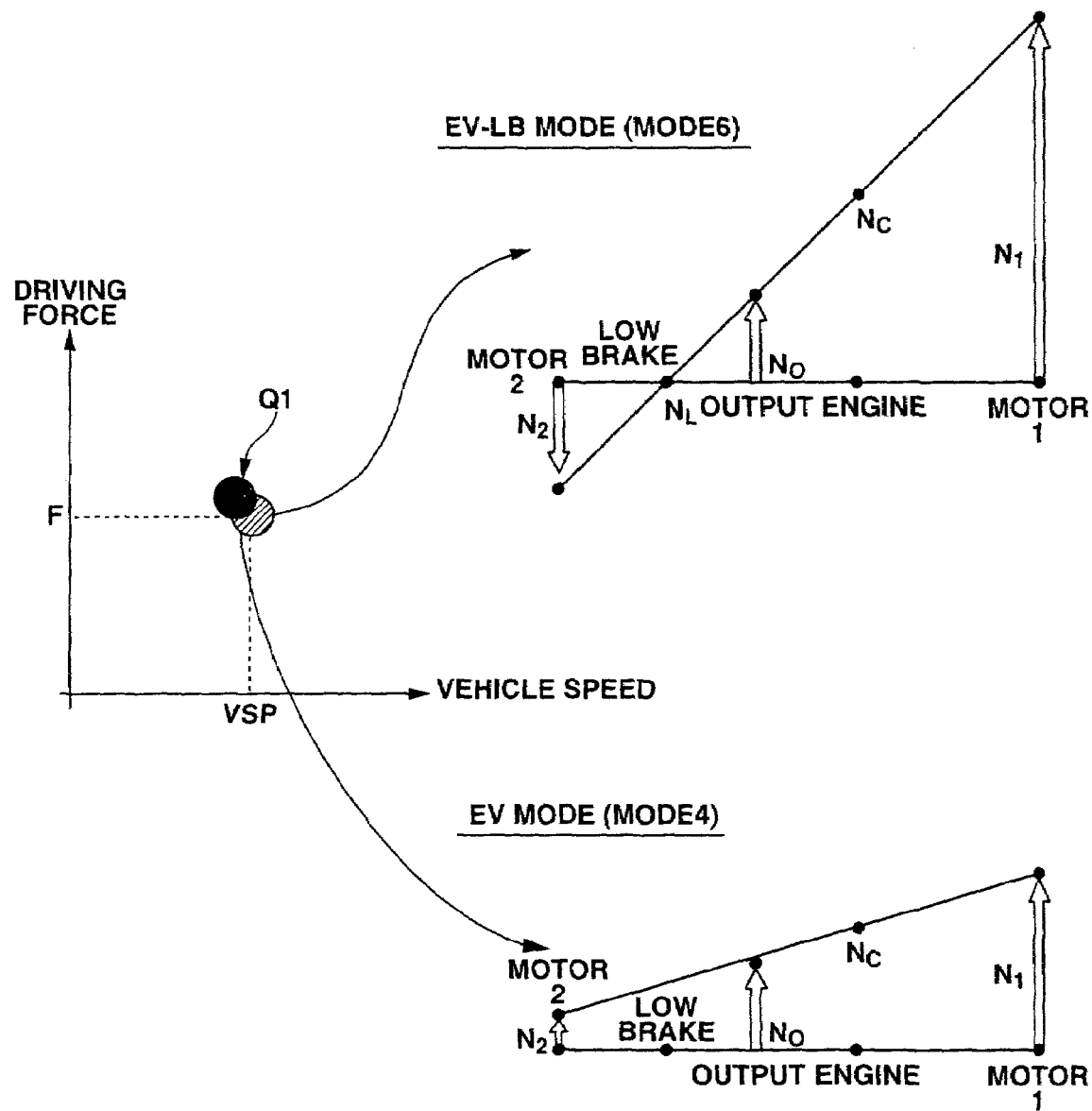
FIG. 12 is lever diagrams at an operating point in EV-LB mode and at the operating point in EV mode.

FIG. 12 shows lever diagrams of EV-LB mode and EV mode at the driving point Q1 just after the driving point in EV-LB mode is transited to the driving point in EV mode as an optimal mode. When the control mode is transited from EV-LB mode to EV mode, first motor/generator revolution speed $N_1$ is decreased and second motor/generator revolution speed $N_2$ is increased in the right revolution. Herein, by detecting a current torque (present torque) and a current revolution speed (present revolution speed) of each rotating element, it becomes possible to calculate the torque and the revolution speed of each rotating element at the driving point in other mode.

Figure 13:
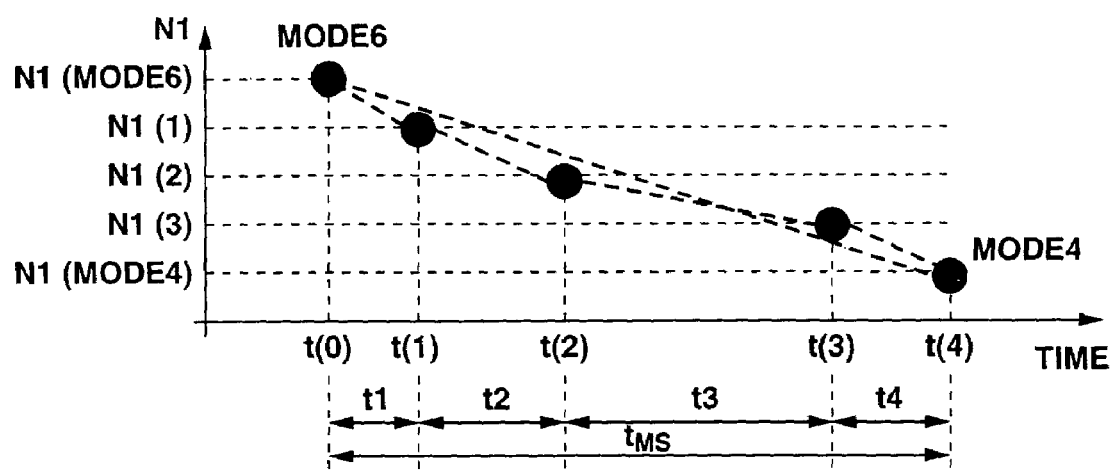
FIG. 13 is a time chart showing the transition time calculation processing.

A difference between the revolution speed Ni(MODE6) of the rotating element in EV-LB mode and the revolution speed Ni(MODE4) of the rotating element in EV mode is divided into several revolution speeds at almost equal intervals, and the transition time for each interval is calculated. FIG. 13 shows a case that the difference of the first motor/generator revolution speeds in EV-LB mode and in EV mode is divided into four at equal intervals of the revolution speed. The revolution speeds in the transition process is represented by $N_1(j)$ {j=1 through 4}, and the time corresponding to the revolution speed is represented by tj.

[First Repetitive Calculation]

At time t0, the degree of change of the torque in the cases that the maximum discharging electric power and the maximum charging electric power of battery 14 are used is calculated. During the calculation, the loss LOSS is calculated using the current revolution speeds and the torques $\{T_1(t0), N_1(t0), T_2(t0), N_2(t0)\}$.

$$T_o = k_1 T_R + k_2 T_{1(j)} + k_3 T_{2(j)}$$

$$N_1 T_{1(j)} + N_2 T_{2(j)} + LOSS = (P_{B,max}, P_{B,min})$$

Initial provisional torques (j=1) corresponding to the maximum discharging electric power and the maximum charging electric power are calculated as follows.

$$P_{B,max} \rightarrow T_{1(1)}{}^{\#1}(P_{B,max}) \& T_{2(1)}{}^{\#1}(P_{B,max})$$

$$P_{B,min} \rightarrow T_{1(1)}{}^{\#1}(P_{B,min}) \& T_{2(1)}{}^{\#1}(P_{B,min})$$

By replacing these torques into the relationship of the input revolution speed, the following revolution speeds are obtained from the expression $d\omega_i/dt = k_3 T_R + k_5 T_1 + k_6 T_2$.

$$T_{1(1)}{}^{\#1}(P_{B,max}) \& T_{2(1)}{}^{\#1}(P_{B,max}) \rightarrow d\omega_{i(1)}/dt(P_{B,max})$$

$$T_{1(1)}{}^{\#1}(P_{B,min}) \& T_{2(1)}{}^{\#1}(P_{B,min}) \rightarrow d\omega_{i(1)}/dt(P_{B,min})$$

Since first and second motor/generator revolution speeds $N_1$ and $N_2$ in EV-LB mode and in EV mode are already known, it is possible to limit the transition speed by suitably selecting one of $P_{B,max}$ and $P_{B,min}$. Further, as to the other rotating elements, the transition speed may be limited by the maximum value of a rate of change of the transmission ratio, a maximum value of the revolution speed or the torque of each rotating element of suppressing the shock due to the mode transition.

By selecting a case of the battery maximum discharging electric power from the above results, the following relationships are obtained.

$$T_{1(1)}{}^{\#1}(P_{B,max}) \rightarrow T_{1(1)}{}^{\#1}$$

$$T_{2(1)}{}^{\#1}(P_{B,max}) \rightarrow T_{2(1)}{}^{\#1}$$

$$d\omega_{i(1)}/dt(P_{B,max}) \rightarrow d\omega_{i(1)}/dt^{\cap 1}$$

[Second Time Repetitive Calculation]

On the basis of the first time calculation result, the calculation is again executed. In this second time repetitive calculation, by using the torque based on the previous calculation result as loss LOSS, loss LOSS becomes further accurate. Accordingly, the following results are obtained.

$$T_0 = k_1 T_R + k_2 T_{1(1)}{}^{\#2} + k_3 T_{2(1)}{}^{\#2}$$

$$N_1(t0)T_{1(1)}{}^{\#2} + N_2(t0)T_{2(1)}{}^{\#2} + LOSS(T_{1(1)}{}^{\#1}, N_1(t0), T_{2(1)}{}^{\#1}, N_2(t0)) = P_{B,max}$$

$$d\omega_{i(1)}{}^{\#2}/dt = k_4 T_R + k_5 T_{1(1)}{}^{\#2} + k_6 T_{2(1)}{}^{\#2}$$

The revolution speed ($=\omega_i$) of $N_{C(1)}$ corresponding to $N_{1(1)}$ is also obtained from the above second repetitive calculation as follows.

$$t_1 = t(1) - t(0) = \{Nc(1) - Nc(MODE6)\}/(d\omega_{i(1)}{}^{\#k}/dt)$$

$$Nc = \{(1+\beta)N_1 + \alpha N_2\}/(1+\alpha+\beta)$$

where k denotes the number of the repetitive calculations, and the repetitive calculations are sufficiently achieved by twice executions in general. The electric power consumed during the period $t_1$ from time t(0) to time t(1) is represented as follows.

$$P_{t0 \rightarrow t1} = N_1(t1)T_{1(1)}{}^{\#k} + N_2(t0)T_{2(1)}{}^{\#k} + LOSS(N_1(t0), T_{1(1)}{}^{\#k}, N_2(t0), T_{2(1)}{}^{\#k})$$

Similar repetitive calculations are executed for a period $t_2$ from time t(1) to time t(2), a period $t_3$ from time t(2) to time t(3), and a period $t_4$ from time t(3) to time t(4), respectively. From these calculation results, transition time $t_{MS}$ is represented as follows.

$$t_{MS} = \Sigma t_j \text{ (j:1 through 4)}.$$

Further, the transition energy $E_{MS}$ is represented as follows.

$$E_{MS} = \Sigma (t_{j-1} \cdot P_{t(j-1) \rightarrow t(j)}) \text{ (j:1 through 4)}.$$

(Operation and Effect of Mode Chattering Preventing Control)

Subsequently, there is discussed a processing of mode-chattering preventing control.

Figure 14:
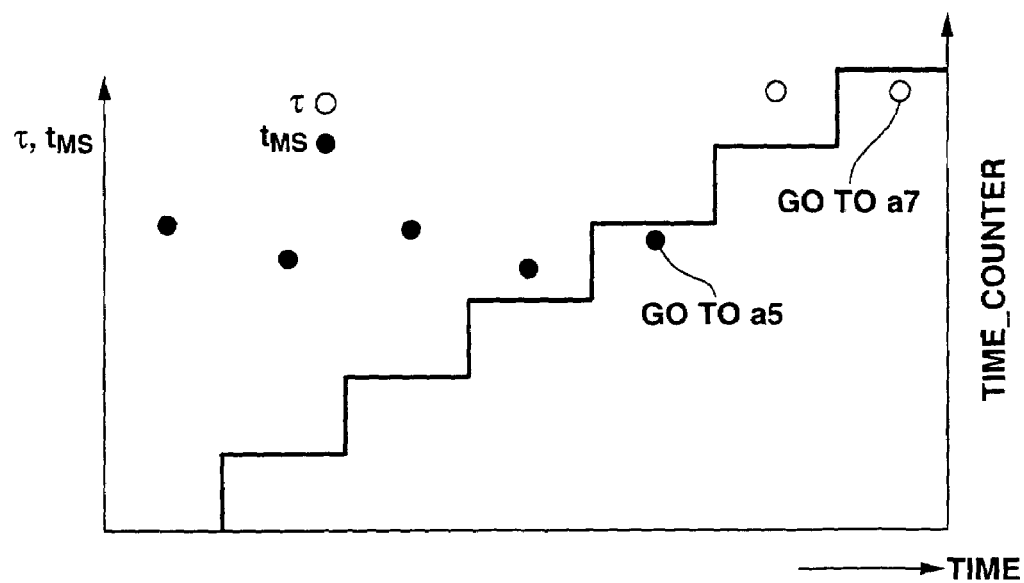
FIG. 14 is a time chart showing a relationship between a counter and a transition time.

FIG. 14 is a graph showing a relationship between transition time $t_{MS}$ and counter TIME_COUNTER. In this Figure, mark ● denotes the transition time $t_{MS}$, and ○ denotes coincident time τ. A stepped continuous line denotes a content (counted value) of counter TIME_COUNTER. When the current mode is not the optimal mode (mode mismatch), transition time $t_{MS}$ and transition energy $E_{MS}$ are calculated by above-discussed processing, and the counting-up of counter TIME_COUNTER is started. When this mode mismatch state is maintained, the content of counter TIME_COUNTER increases. However, since transition time $t_{MS}$ is calculated by each control cycle, transition time $t_{MS}$ and transition energy $E_{MS}$ are properly calculated so as to be adapted to the running condition.

Figure 15:
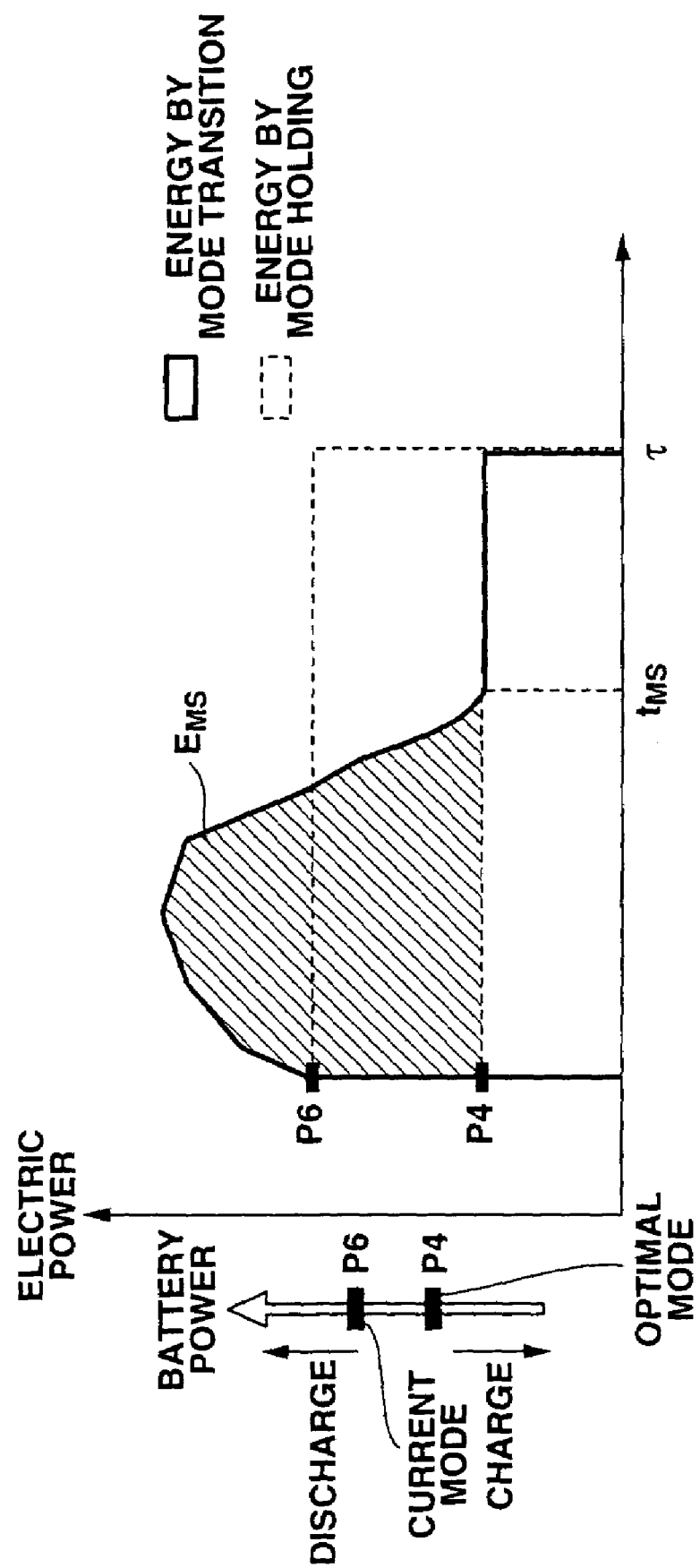
FIG. 15 is a graph showing the transition energy.

When the content of counter TIME_COUNTER becomes greater than transition time $t_{MS}$, the coincident time τ, at which the sum E(optimal) between the energy at the moment that the control mode is transited to the optimal mode and the transition energy EMS and the energy E(current) in case that the current mode is held, is calculated. FIG. 15 is a graph showing energy caused by the mode transition. In this Figure, an area denoted by hatching is transition energy EMS, a rectangle area surrounded by a dotted line having a height P6 is the energy E (current), and a zone surrounded by a bold line is the energy E(optimal). As shown in FIG. 15, the execution of the mode transition requires the energy for changing the relationship of the revolution speeds and the torques of (motor/generators, engine). Accordingly, it is necessary to once change the state of the battery electric power to the discharge side. It is determined whether or not the counter TIME_COUNTER becomes greater than the coincident time τ. When it is determined that the counter TIME_COUNTER becomes greater than the coincident time τ, the current mode is transited to the optimal mode.

There is discussed merits of the first embodiment according to the present invention hereinafter.

(1) When the energy necessary for executing the mode transition is large, the current mode, which is not transited, is maintained as possible. This arrangement suppresses the energy consumption due to the mode-chattering. Further, when the necessary energy is small, the mode is quickly transited to the optimal mode. this arrangement also suppresses the energy consumption.

By controlling the mode transition according to the time calculated based on the transition energy without providing a hysteresis region on the optimal mode map, it becomes possible to achieve the mode transition according to the running state by means of a simple calculation without utilizing a large memory capacity. Specifically, the memory capacity is largely decreased it this system according to the present invention is adapted to a vehicle having a plurality of modes, as like as EIVT system.

(2) When the transition time $t_{MS}$ and transition energy $E_{MS}$ for the mode transition are calculated, by employing the estimated running load TR in this calculation, it becomes possible to set the holding time according to the running circumstance.

(3) By calculating the loss LOSS generated at inverter 13 and first and second motor/generators MG1 and MG2 from the repetitive calculation using the revolution speeds and torques of first and second motor/generators MG1 and MG2 during the mode transition, it becomes possible to obtain the accurate transition time and the accurate transition energy.

(4) When the transition time $t_{MS}$ and transition energy $E_{MS}$ for the mode transition are calculated, by executing the calculations thereof based on the battery maximum discharging electric power and the battery maximum charging electric power, it becomes possible to further accurately calculate the transition time $t_{MS}$ and transition energy $E_{MS}$ according to the actual battery capacity. Although the first embodiment has been shown and described such that the transition time is calculated using the revolution speed $d\omega i/dt$ of engine clutch 8, When the mode transition is executed between EV mode and EV-LB mode, it is not necessary to take account of the fuel consumption quantity of engine 15. Therefore, the transition time $t_{MS}$ and the transition energy $E_{MS}$ are easily calculated using a simple structure.

Second Embodiment

Subsequently, there is discussed a second embodiment according to the present invention. A basic construction of the second embodiment is similar to that of the first embodiment, and therefore the explanation is made only as to different parts from those of the first embodiment.

Figure 16:
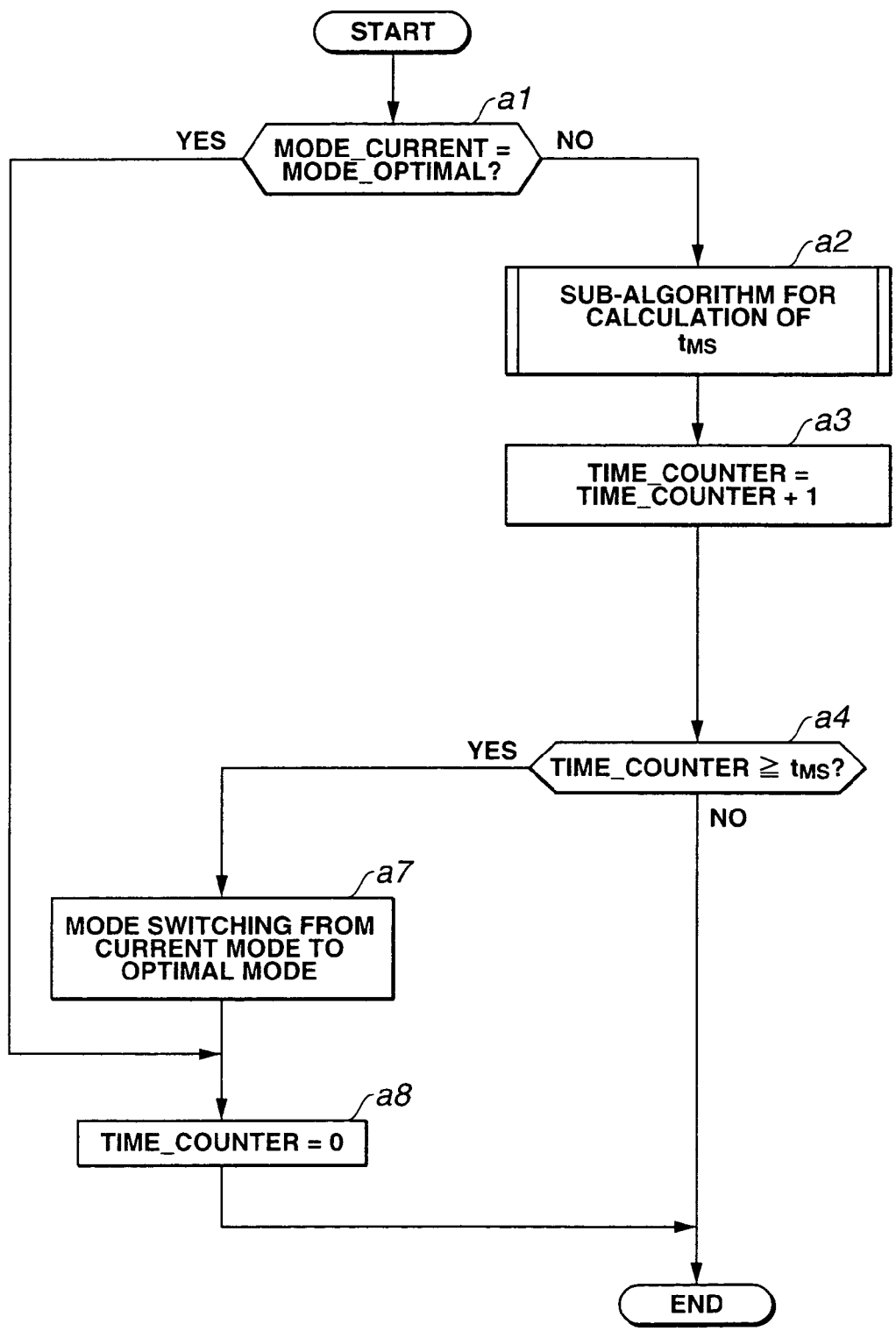
FIG. 16 is a flowchart showing the mode-chattering preventing control processing according to a second embodiment according to the present invention.

FIG. 16 is a flowchart showing the mode-chattering preventing control processing executed in the second embodiment according to the present invention. Although the first embodiment has been shown and described such that the coincident time $\tau$ is calculated after counter TIME_COUNTER became larger than the transition time $t_{MS}$, the second embodiment is arranged such that the mode transition is executed according to only the transition time $t_{MS}$ without depending on the coincident time $\tau$. This arrangement decreases the calculation load.

Third Embodiment

Subsequently, there is discussed a third embodiment according to the present invention. A basic construction of the third embodiment is similar to that of the first embodiment, and therefore the explanation is made only as to different parts from those of the first embodiment.

Figure 17:
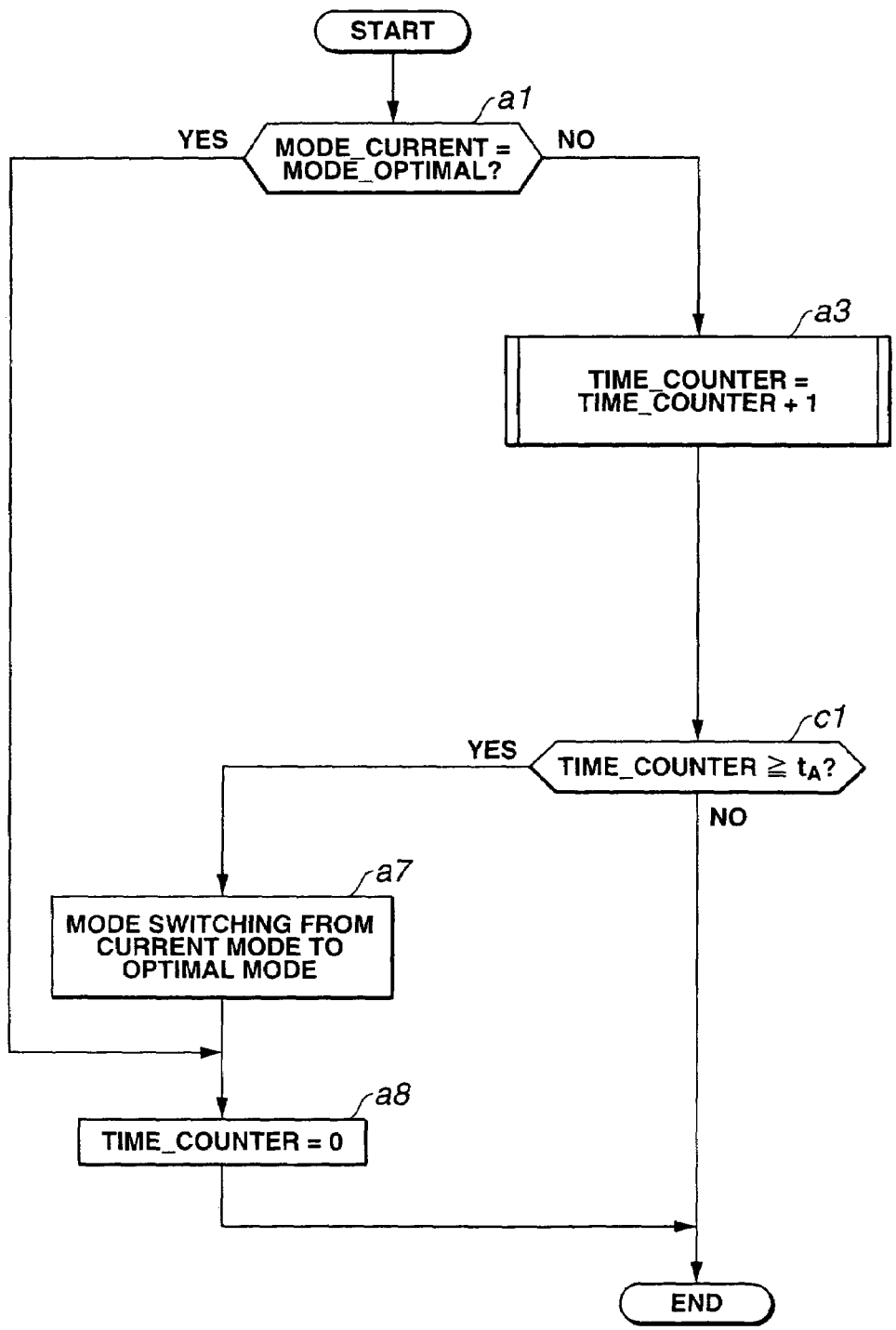
FIG. 17 is a flowchart showing the mode-chattering preventing control processing according to a third embodiment of the present invention.

FIG. 17 is a flowchart showing the mode-chattering preventing control processing executed in the third embodiment according to the present invention. The third embodiment is specifically arranged such that the mode transition is executed after a predetermined time period elapsed. More specifically, at step c1 subsequent to the execution of step a3, it is determined whether or not counter TIME_COUNTER becomes greater than a predetermined value tA. Subsequently, when the determination at step c1 is affirmative, the routine proceeds to step a7 wherein the mode switching is executed. By this arrangement of the third embodiment, it becomes possible to achieve the mode-chattering preventing control without executing any calculation.

This application is based on Japanese Patent Application No. 2004-199242 filed on Jul. 6, 2004 in Japan. The entire contents of this Japanese Patent Application are incorporated herein by reference.

Although the invention has been described above by reference to certain embodiments of the invention, the invention is not limited to the embodiments described above. For example, the prevent invention may be adapted to the mode-chattering preventing controls of an electric vehicle having a plurality of running modes, other hybrid vehicles and an internal combustion engine equipped vehicle. Modifications and variations of the embodiments described above will occur to those skilled in the art, in light of the above teaching. The scope of the invention is defined with reference to the following claims.

What is claimed is:

1. A vehicle control system comprising:
 a controller arranged
  to select an optimal mode adapted to a driving point of a vehicle from an optimal mode map defining a plurality of running modes of the vehicle,
  to detect a generation of a mode transition from a current running mode to the optimal mode in the optimal mode map, and
  to hold the current running mode, which was selected before the transition from the current running mode to the optimal mode, for a holding time period when the generation of the mode transition is detected,
  wherein the controller is further arranged to calculate a time period necessary for the mode transition from the current running mode to the optimal mode at the driving point at which the generation of the mode transition is detected, and wherein the holding time period is determined based on the mode transition time period.

2. The vehicle control system as claimed in claim 1, wherein the controller is further arranged to calculate energy necessary for the mode transition at the driving point at which the generation of the mode transition is detected, and to calculate energy coincident time by which the energy of a maintained mode is coincident with energy of the transition mode, the holding time period being determined based on the energy coincidence time.

3. The vehicle control system as claimed in claim 1, wherein the controller is further arranged to limit a transition speed of the mode transition, and wherein the holding time period is set such that the transition speed becomes smaller than or equal to the limited transition speed.

4. The vehicle control system as claimed in claim 1, wherein the controller is further arranged to estimate a running load of the vehicle, and wherein the holding time period is determined based on the estimated running load.

5. The vehicle control system as claimed in claim 1, further comprising:

a differential gear transmission comprising a planetary gearset including rotating elements which are connected to a plurality of driving sources including an internal combustion engine and at least one motor, an engagement element which is attached to one of the rotating elements and which produces a fixed transmission ratio by putting the engagement element in an engaged state and which produces a continuously variable transmission ratio by putting the engagement element in a disengaged state, and an engine clutch for engaging and disengaging a connection between the engine and the planetary gearset; and a battery connected to the motor to charge and discharge electric power from and to the motor, wherein the controller is further arranged to control the engagement and the disengagement of each of the engagement element and the engine clutch to produce a desired running mode.

6. The vehicle control system as claimed in claim 5, wherein the controller is further arranged to limit a transition speed according to at least one of a maximum discharging electric power and a maximum charging electric power of the battery.

7. The vehicle control system as claimed in claim 5, wherein the controller is further arranged to limit a transition speed by limiting a revolution speed of one of the rotating elements of the differential gear transmission.

8. The vehicle control system as claimed in claim 5, wherein the controller is further arranged to execute holding of the current running mode when the running mode is transited from a first running mode produced by disengaging both of the engine clutch and the engagement element to a second running mode produced by disengaging the engine clutch and by engaging the engagement element, and to estimate a running load of the vehicle.

9. A vehicle control system comprising:

a transmission comprising a planetary gearset whose rotating elements are connected to an internal combustion engine, at least one motor and an output, an engine clutch through which a rotating element of the planetary gearset is connected to the engine, and an engagement element which is capable of engaging one of the rotating elements except for the rotating elements connected to the engine and the output, the transmission being capable of producing a plurality of running modes by changing engagement states of the engine clutch and the engagement element; and a controller arranged to select an optimal mode adapted to a driving point of a vehicle from an optimal mode map defining the running modes, to detect a generation of a mode transition from a current running mode to the optimal mode in the optimal mode map, and to hold the current running mode, which was selected before the transition from the current running mode to the optimal mode, for a holding time period from the generation of the mode transition, when the generation of the mode transition is detected, wherein the controller is further arranged to calculate a time period necessary for the mode transition from the current running mode to the optimal mode at the driving point at which the generation of the mode transition is detected, and wherein the holding time period is determined based on the mode transition time period.

10. A vehicle control system comprising:

optimal mode selecting means for selecting an optimal mode adapted to a driving point of a vehicle from an optimal mode map defining a plurality of running modes of the vehicle;

mode transition detecting means for detecting a generation of a mode transition from a current running mode to the optimal mode in the optimal mode map;

mode transition holding means for holding the current running mode, which was selected before the transition from the current running mode to the optimal mode, for a holding time period when the generation of the mode transition is detected;

mode transition time period calculating means for calculating a time period necessary for the mode transition from the current running mode to the optimal mode at the driving point at which the generation of the mode transition is detected; and holding time period determining means for determining the holding time period based on the mode transition time period.

* * * * *